(12) United States Patent
Ferrero et al.

(10) Patent No.: US 8,568,037 B2
(45) Date of Patent: Oct. 29, 2013

(54) FLANGED BEARING RING FOR THE HUB OF A MOTOR VEHICLE WHEEL

(75) Inventors: Alessandro Ferrero, Turin (IT); Marco Gemello, Nichelino (IT); Andreas Knopf, Würzburg (DE); Paolo Re, Nichelino (IT)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 13/426,677

(22) Filed: Mar. 22, 2012

(65) Prior Publication Data

US 2012/0263407 A1    Oct. 18, 2012

(30) Foreign Application Priority Data

Mar. 29, 2011 (IT) .............................. TO2011A0274

(51) Int. Cl.
*F16C 33/00* (2006.01)
*F16C 33/64* (2006.01)

(52) U.S. Cl.
USPC .......................................... 384/544; 384/492

(58) Field of Classification Search
USPC ................................. 384/544, 492
See application file for complete search history.

(56) References Cited

U.S. PATENT DOCUMENTS

| 4,715,780 | A * | 12/1987 | Kan | 415/200 |
| 6,866,422 | B2 * | 3/2005 | Griseri et al. | 384/537 |
| 2002/0174545 | A1 | 11/2002 | Kiyosawa | |
| 2005/0163410 | A1 * | 7/2005 | Sakamoto | 384/544 |
| 2010/0021099 | A1 * | 1/2010 | Torii | 384/544 |

FOREIGN PATENT DOCUMENTS

| WO | WO2008147284 A1 | 12/2008 |
| WO | WO2010063299 A1 | 6/2010 |

* cited by examiner

*Primary Examiner* — Thomas R Hannon
(74) *Attorney, Agent, or Firm* — Bryan Peckjian; SKF USA Patent Group

(57) ABSTRACT

The ring (10) is provided with a tubular radially inner steel core (15) and an outer body (16) of lightweight metal formed around the core with a radial flange (17). The outer surface of the core includes a conical surface (21) which tapers in the axially inner direction, having a straight profile, when viewed in axial section. The conical surface (21) is perpendicular to a median line which bisects an axially inner raceway (11) and which corresponds to the row (13) of bearing balls against the axially inner raceway (11).

8 Claims, 3 Drawing Sheets

FLANGED BEARING RING FOR THE HUB OF A MOTOR VEHICLE WHEEL

CROSS-REFERENCE TO RELATED APPLICATION

This US Non-Provisional Utility application claims the benefit of copending Italy Provisional Patent Application Serial No. TO2011A00274, filed on 29 Mar. 2011, which is incorporated herein in its entirety.

FIELD OF THE INVENTION

The present invention relates to a lightweight, flanged bearing ring for the hub of a motor vehicle wheel, particularly a rotatable ring with a flange providing connection to the wheel and/or the brake rotor.

SUMMARY OF THE INVENTION

The motorcar industry has to comply with an ever increasing demand for weight reduction in motor vehicle components for the sake of cutting down fuel consumption and exhaust emissions. With a vehicle wheel bearing, weight reduction may not imply any reduction in strength and safety. The raceways must be made of a material hard enough to resist the stresses of rolling contact. Conventional bearing grade steel is still widely used. The raceways are heat treated so as to attain a level of hardness and microstructure homogeneity adequate to withstand the stresses caused by rolling Hertzian contact.

Recent flanged bearing rings include a radially inner, annular or tubular insert (or core) made of bearing grade steel and forming one or two raceways, and a radially outer body forming a radially outwardly extending flange around the insert and made of a lightweight material such as aluminium alloy. The lightweight flange is designed to mount the wheel and/or the brake rotor and transfer loads from these components to the tubular insert.

WO 2008/147284 A1 discloses a bearing ring made up of two different materials joined together in a single piece, namely a first, high toughness material such as bearing grade steel forming the raceways and a second, lightweight material, such as a lightweight metal, forming the rest of the ring. The second material is joined to the first material by a semi-solid casting process.

It is a primary object of the present invention to provide an intimate, reliable coupling between the two different portions of a flanged bearing ring made of two different materials, namely a first, hard material and a second, lightweight material. Particularly, it is desired to neutralize the forces acting at the interface between the tough steel core and the lightweight outer body. It is a still further object to design the interface between the inner steel core and the lightweight outer body so as to prevent cracks from forming in the latter as a result of the loads transmitted to the bearing ring throughout the whole range of working conditions. Besides, the bearing ring of the invention is required to provide a lower overall weight, while ensuring the required high strength capabilities.

The above and further objects and advantages are attained, in accordance with the invention, by a flanged bearing ring having the features set forth in claim 1. Preferred embodiments of the invention are defined in the dependent claims.

BRIEF DESCRIPTION OF THE DRAWINGS

In order that the present invention may be well understood there will now be described a preferred embodiment thereof, given by way of example, reference being made to the accompanying drawings, in which.

DETAILED DESCRIPTION OF THE INVENTION

Figure 1:
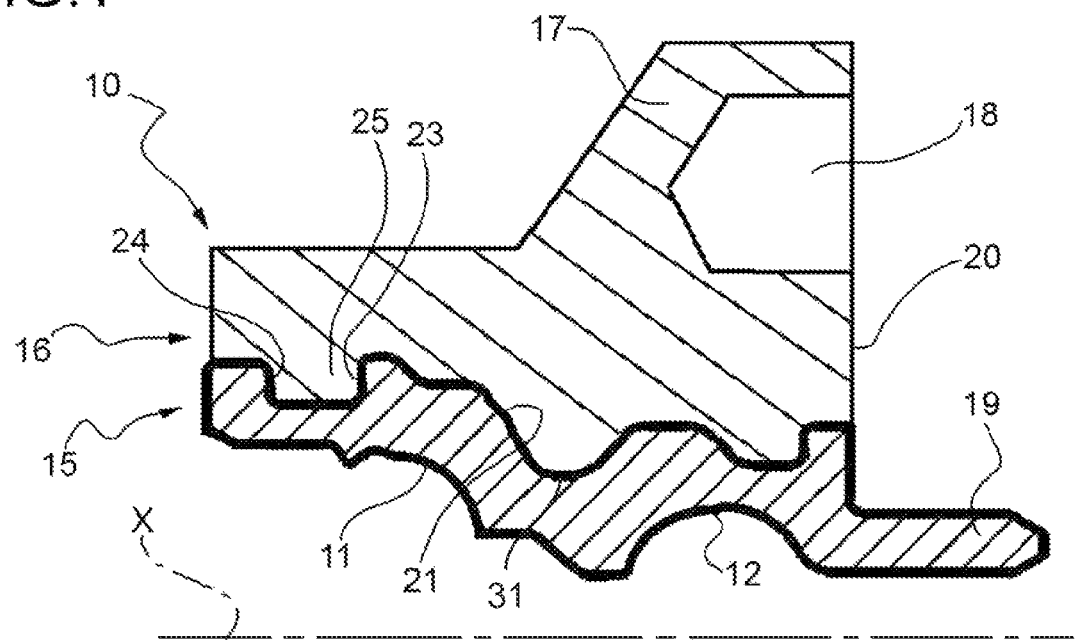
FIG. 1 is a partial, axial cross-sectional view of an embodiment of a flanged bearing ring according to the invention.

Referring initially to FIG. 1, designated overall at 10 is a flanged bearing ring in accordance with an embodiment of the invention. The ring 10 is designed to be the outer, rotatable ring of a double-row angular contact ball bearing for vehicle applications, particularly for mounting to a vehicle wheel (not shown) to be rotationally supported relative to a stationary suspension standard (not shown) of the vehicle around a central axis of rotation x. Throughout the present description and the claims, terms and expressions indicating positions and directions such as "radial" and "axial" are understood as referring to the axis of rotation x of the bearing. Expressions such as "inboard" and "outboard" instead refer a condition when mounted on a vehicle.

Figure 4:
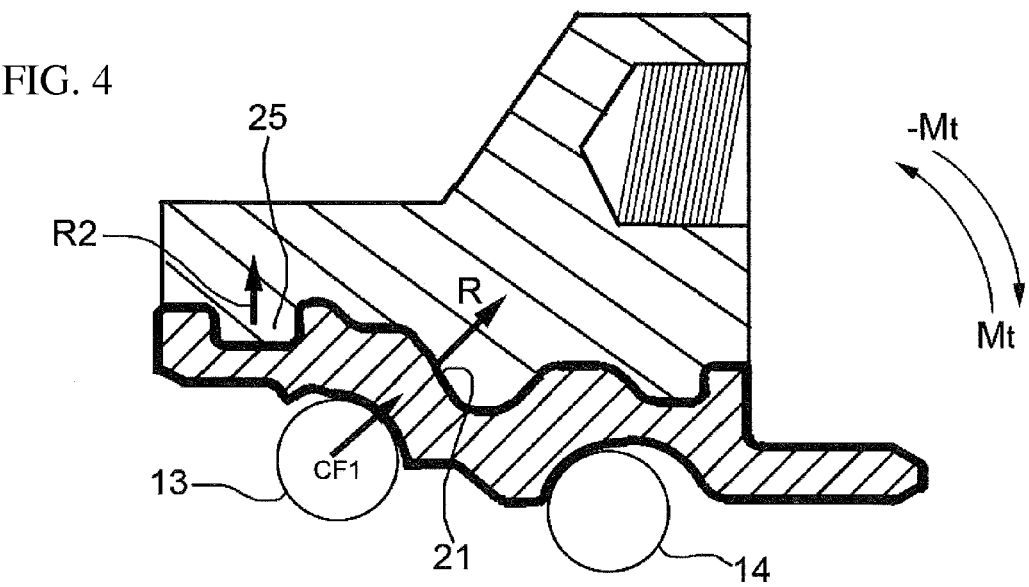
FIG. 4 is a view similar to that of FIG. 1, further showing bearing balls.

The bearing ring 10 provides two raceways 11, 12 for two rows of bearing balls 13, 14 (FIG. 4). The raceway 11 at the inboard side has a pitch diameter greater than that of the outboard raceway 12. The ring 10 comprises a radially inner insert or core 15 of a generally tubular shape and a radially outer body 16 providing a radially outwardly extending flange 17 at the outboard side of the core 15. The flange 17 provides a number of bores 18 to allow connection to the vehicle wheel by means of stud bolts (not shown).

The core 15 is made of a first, hard and tough material, preferably a bearing grade steel. The radially outer body 16 is made of a second, lightweight material. A lightweight metal is preferred, such as aluminium, magnesium, or alloys thereof. Other suitable materials for the outer body may include, but not be limited to, carbon composites or reinforced polymers. In order to provide adequate structural support to the outer body 16, the steel core 15 extends axially through the whole width of the outer body, from the inboard to the outboard side. The tubular core 15 forms an axial tubular extension or spigot 19 at its outboard side, which facilitates centring of the vehicle wheel. The spigot 19 protrudes axially from the axially outer face 20 of the flange 17.

The outer body 16 may be formed around the core 15 in a number of different ways, for example through a semi-solid casting process, or by sintering or casting, or die-casting. At the end of any of these processes, the lightweight material tightly copies the outer shape of the core 15, whereby the inner and outer bodies interlock with one another. The outer shape of the core 15 is designed in order to reduce adverse effects of the forces acting at the interface between the core and the outer body 16.

Figure 3:
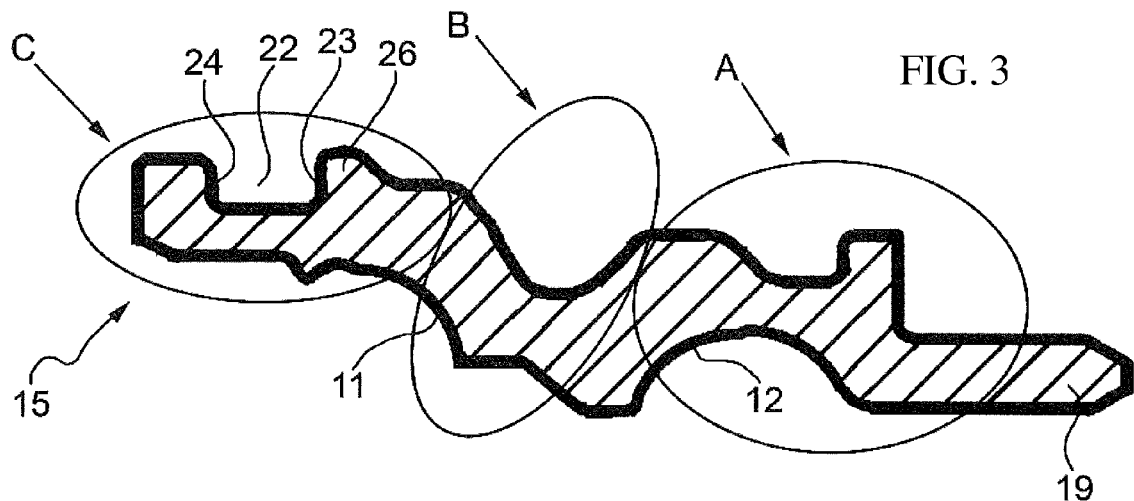
FIG. 3 is an axial cross-sectional view of the tubular core of FIG. 2.

Referring now to FIG. 3, the core 15 can be ideally subdivided in three main portions, designated A, B, C. Portion A is located at the outboard flange side, where the mating component (wheel and brake rotor, not shown) is to be attached. The axially inner side of portion A comprises a major part of the outboard side raceway 12. Portion C is located at the inboard side, and includes the axially inner part of inboard side raceway 11. Portion B is an axially intermediate portion connecting portions A and C. The average inner diameter of portion A is significantly smaller than the average inner diameter of portion C. As a result, the connecting portion B is tapered, with an average diameter that increases while moving from the outboard to the inboard side. Particularly, the outer profile of portion B is tapered. The relevance of this feature will become clearer herein after.

Loads applied to the flanged ring are shown diagrammatically in FIG. 4. The flanged ring is subjected to a tilting moment Mt applied from the mating components (wheel, brake rotor) and transferred to the bearing balls. As a reaction, the flange 17 is subjected to reaction forces from the balls contacting the raceways. In particular, the most relevant reaction is given by the inboard row 13, which is therefore designed with a greater pitch diameter. The reaction force from the inboard row is indicated CF1.

The resultant reaction force R that the core 15 transmits to the outer lightweight body 16 is exchanged through a conical surface 21 which has a straight outline, when viewed in axial cross section, oriented essentially perpendicular to a mid-line which bisects the axially inner raceway and corresponds to the line of action of the resultant CF1 of the contact pressures exerted by the inboard row 13 of bearing balls against the inboard raceway 11.

In the preferred embodiment, the said line of action passes through the centre or mid portion of the tapered surface 21. The advantage of this arrangement is that the reaction force R is imparted to the lightweight body 16 at an interface surface having a substantially flat or straight contour when viewed in an axial cross section. In other terms, the absence, in the connecting portion B, of a convex contour in the steel core will prevent cracks that would otherwise be generated in the lightweight body as a result of a sort of "local wedging" effect of a convex part of steel in the correspondingly concave lightweight body surrounding the core.

At the inboard end of the core 15, a circumferentially extending annular groove 22 is formed with at least one, but preferably two axially facing negative slope undercuts 23, 24 defining a dovetail joint section with the complementary annular, radially inwardly extending rib 25 formed by the lightweight body 16. In this context, the term "undercut" is to be construed as meaning that at least one of the two sides of the groove 22 has an overhanging portion in relief. For example, the angle of the undercuts may be of about 85 degrees. The undercut(s) 23 (and/or 24) provides a high level of interlock against relative movement between the outer body 16 and the inner core 15 in a direction perpendicular to the axis of rotation x. This radially directed retaining action is particularly useful in resisting a traction force tending to pull the lightweight material 16 radially away from the steel core 15 as a result of a negative tilting moment –Mt being applied to the bearing ring through the flange 17. The resisting force is designated R2. It is particularly convenient to locate the undercut(s) 23, 24 at the axially inner end of the bearing ring, i.e. farthest from the flange 17, since at this location the resisting force will exploit the maximum possible length of the lever arm for opposing the tilting moment –Mt. Furthermore, since a lightweight metal such as aluminum and its alloys have a thermal expansion coefficient higher than that of the bearing grade steel which the core is made of, the dovetail arrangement will provide an even higher degree of mutual locking between the core and the outer body at high temperatures, when the lightweight metal rib 25 will expand more than the steel groove 22 accommodating it.

The annular groove 22 is bounded, on its outboard side, by a radially outwardly protruding shoulder 26. This shoulder is delimited radially outwardly by a cylindrical surface 27, axially inwardly by the substantially radially oriented undercut surface 23, and axially outwardly by the axially outwardly tapering conical surface 21. In order to provide an efficient anti-rotation coupling between the steel core and the lightweight outer body, a plurality of radial notches 28 are formed in the outer surface of the core 15 by forging. The notches 28 are angularly equally spaced around the central axis of rotation x. The non-circular section 29 of the core containing the notches 28, cooperating with the mating surfaces in the outer body 16 provides a high degree of interlock against relative movement between the outer body and the core in a circumferential direction about the axis of rotation x.

Figure 2:
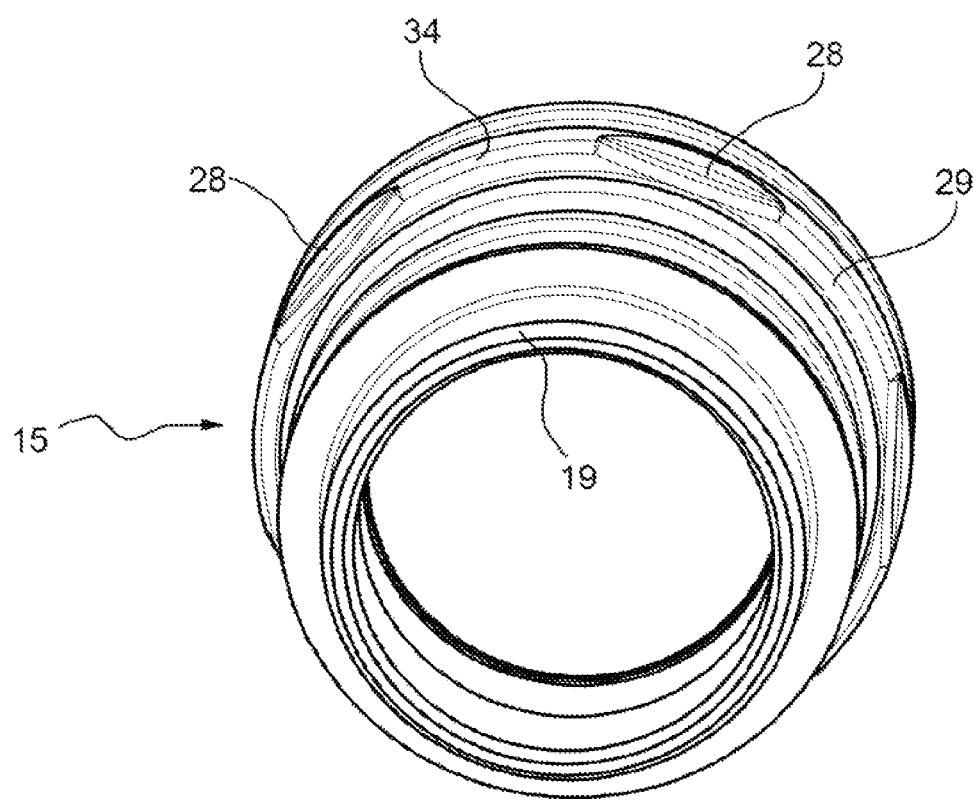
FIG. 2 is a perspective view of a steel tubular core constituting the inner part of the flanged bearing ring of FIG. 1.
Figure 5:
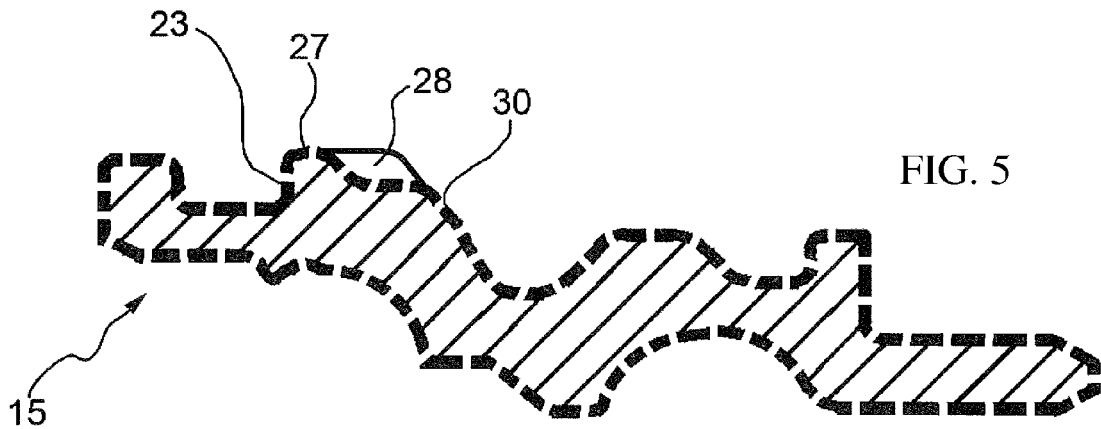
FIG. 5 is a view, similar to that of FIG. 3, schematically showing in full line surfaces that are processed differently from those shown in phantom line.
Figure 6:
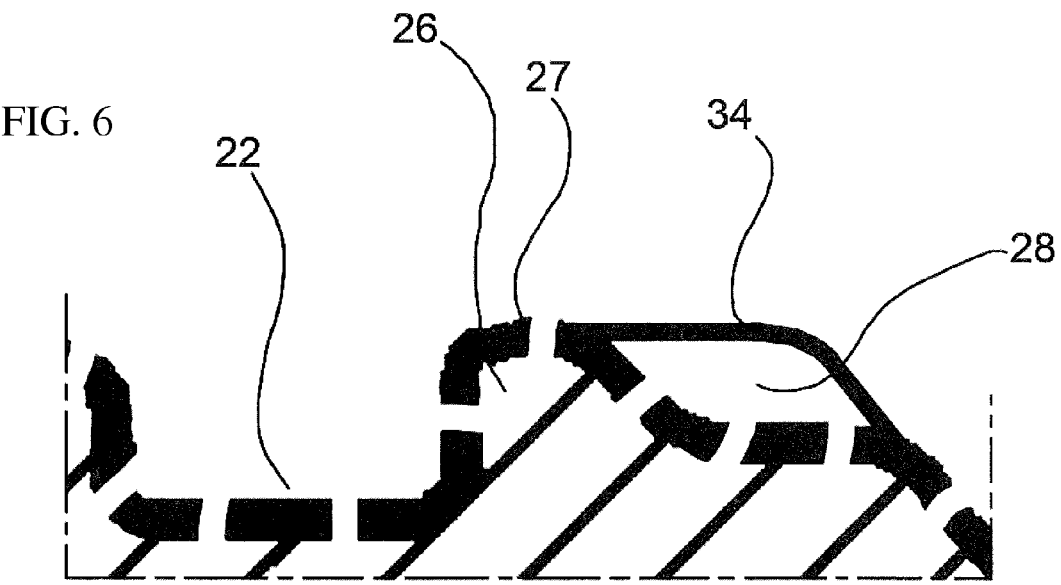
FIG. 6 is an enlarged view of a detail of FIG. 5.

The part is designed to be manufactured with turning operations, which can only provide surfaces shaped as solids of revolution. The intersection of a turning profile with non-circular shapes generates edges, that must be removed by a machining operation by 3D milling machine, to be added on purpose. In order to avoid introduction of said milling operation, the non circular cross section 29 providing the notches 28 is obtained by forging, whereas all the other profiles of the core must be obtained by subjecting the core to a further turning step. In FIG. 5 the turned profile is shown in dotted line, while forged surfaces are shown in solid line. The forging process provides parts with wider tolerances with respect to turning. Therefore, in order to have a time efficient turning process, a transition point between forged and turned areas has to be set. Turning design is set on the core in such a way that the transition line 30 between the turned and the forged surfaces, generally characterized by an edge, is located at the axially inner side of the tapered surface 21, and not on the radius 31, since a sharp edge or corner on the radius would provide a wedge, enhancing the formation of cracks in the lightweight material of outer body 16. Designated at 34 in FIGS. 2 and 6 are non-notched portions of section 29 between two consecutive notches 28.

The cylindrical surface 27 joins the non-circular section 29 and the undercut face 23 and extends circumferentially around the entire core 15. In the absence of the cylindrical surface 27, the shoulder 26 would exhibit a back-face requiring specific 3D milling to eliminate edges potentially harmful for the stress distribution. Due to the above arrangement, a simple turning operation provides transition from non axial-symmetric to axial-symmetric area (of the groove 22) with a smooth profile, simultaneously providing a 360 degrees shoulder for the groove.

Figure 7:
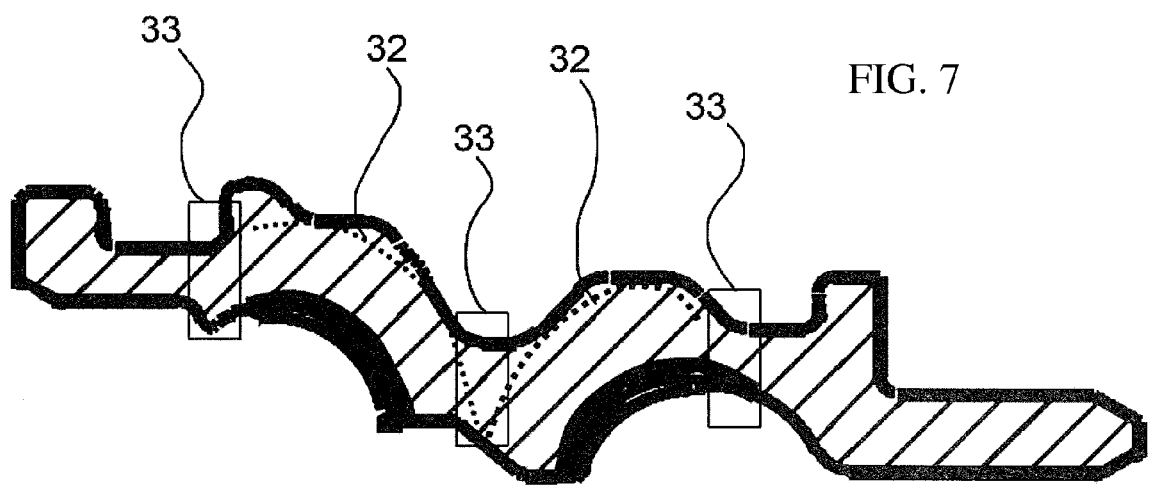
FIG. 7 is a further view, similar to those of FIGS. 3 and 5, schematically indicating zones of the tubular core processed differently from others.

As noted above, the core has to provide functional surfaces (the raceways) for resisting rolling Hertzian contact stresses. Such surfaces are locally hardened, for example by induction and quenching, to reach high hardness and a specific microstructural arrangement. The hardening process must affect only specified areas, as shown in FIG. 7, while leaving surrounding areas in soft conditions. In order to avoid through hardening, i.e. a hardened state for the entire radial thickness of the tubular core, a minimum insert thickness MHT is requested. In the preferred embodiment, the minimum thickness MHT of about 5 mm is extended only to the hardened area around the raceways, as indicated in FIG. 7 by reference number 32. Out of these areas the thickness is conveniently reduced by 2 to 2.5 times the MHT, as indicated at 33, thereby allowing to form locking means (such as recesses and grooves) in the core and balancing the lowest possible weight efficiency versus the hardenability requirement.

With rotating bearing rings, the hardened profile has to be radially uniform. In other words, the hardened depth has to be constant throughout 360 degrees of rotation, as all sectors are periodically affected by maximum Hertzian contact. The heating and cooling steps during the hardening process are influenced by local thickness. In the preferred embodiment, therefore, the radially thicker non-circular section 29 is located as remotely as possible from the raceways so as not to adversely affect the hardening.

What we claim is:

1. A flanged bearing ring for a motor vehicle wheel, the ring being made up of two different materials joined together as a single piece, the ring comprising:
   a radially inner tubular core which forms an axially inner raceway and an axially outer raceway having a pitch diameter smaller than the axially inner raceway around a central axis of rotation, the core providing a radially outer surface and being made of a first high toughness material;
   a radially outer body forming a radially outwardly extending flange around the core and made of a second material being lighter than the first material; and wherein
   the radially outer surface of the core includes a conical, axially inwardly tapered surface having a straight outline, when viewed in axial cross section, oriented essentially perpendicular to a mid-line bisecting the axially inner raceway and corresponding to the line of action of the resultant of the contact pressures exerted by an inboard row of bearing balls against the axially inner raceway.

2. The flanged bearing ring according to claim 1, wherein the axially inwardly tapered surface is bisected by the mid-line and is located opposite to the axially inner raceway with respect to the direction of that mid-line.

3. The flanged bearing ring according to claim 1, wherein the radially outwardly extending flange is formed at an axially outer end of the ring, and wherein the core provides an axially inner end portion forming a circumferentially extending annular groove, and at least one side of the groove provides an undercut surface.

4. The flanged bearing ring according to claim 3, wherein the groove is formed with two axially facing undercuts defining a dovetail joint section with a complementary annular, radially inwardly extending rib formed by the outer body.

5. The flanged bearing ring according to claim 4, wherein the core comprises a radially outwardly protruding shoulder which is bounded on its axially inner side, by the annular groove, and on its axially outer side, by the axially inwardly tapered surface; the protruding shoulder further providing a non-circular section, axially intermediate the groove and the tapered surface, wherein formed in the non-circular section are radial recesses providing anti-rotation means cooperating with complementary portions formed by the outer body.

6. The flanged bearing ring according to claim 5, wherein the protruding shoulder is delimited radially outwardly by a cylindrical surface.

7. The flanged bearing ring according to claim 5, wherein the tapered surface is turned, the non-circular section is not turned, and wherein a circular transition line defined between the turned and the non turned surfaces, is located out of the conical surface.

8. The flanged bearing ring according to claim 1, wherein the thickness of the core in the zones of the raceways is of at least about 5 mm, and wherein the hardened areas around the raceways do not extend throughout the entire thickness of the core.

\* \* \* \* \*